United States Patent [19]

Braillon

[11] 4,379,277

[45] Apr. 5, 1983

[54] MAGNETIC CHUCK

[76] Inventor: Philibert M. Braillon, Montmelian (Savoie), France

[21] Appl. No.: 181,085

[22] Filed: Aug. 22, 1980

[30] Foreign Application Priority Data

Aug. 27, 1979 [FR] France ................ 79 21962

[51] Int. Cl.³ ............................................ H01F 7/04
[52] U.S. Cl. ................................ 335/295; 335/306
[58] Field of Search ............. 335/285, 286, 295, 302, 335/306, 288

[56] References Cited

U.S. PATENT DOCUMENTS

| 2,471,067 | 5/1949 | Hitchcock | 335/295 |
| 3,017,545 | 1/1962 | Meier | 335/295 |
| 3,818,399 | 6/1974 | Edwards | 335/295 |
| 4,055,824 | 10/1977 | Baermann | 335/295 |

FOREIGN PATENT DOCUMENTS

| 1178531 | 9/1964 | Fed. Rep. of Germany | 335/295 |
| 1179653 | 10/1964 | Fed. Rep. of Germany | . |
| 2423453 | 11/1975 | Fed. Rep. of Germany | . |
| 785601 | 8/1935 | France | . |
| 1333449 | 3/1957 | France | . |
| 1135767 | 5/1957 | France | . |
| 1452241 | 8/1966 | France | 335/295 |
| 939584 | 10/1963 | United Kingdom | 335/295 |

*Primary Examiner*—George Harris
*Attorney, Agent, or Firm*—Karl F. Ross; Herbert Dubno

[57] ABSTRACT

A magnetic chuck or holder for workpieces adapted to be mounted on a worktable of a machine tool comprises a stack of alternating permanent magnets and magnetically conducting plates having a central passage through the stack in which a second stack of magnets and magnetically conductive plates is received for longitudinal movement, e.g. by a crank or an eccentric drive cooperating with one end of the second step. The two stacks are so arranged that they magnetically cancel the magnetic field lines on the upper, lateral and bottom surfaces of the chuck in one position of the second stack but create such field lines in a second position that all surfaces of the upper, lower and lateral surfaces are magnetically effective. This allows switching of the chuck to an effective state so that a workpiece is affixed magnetically to the upper surface of either or both lateral surfaces, and at the same time the chuck is magnetically fixed on the worktable of the machine tool.

7 Claims, 6 Drawing Figures

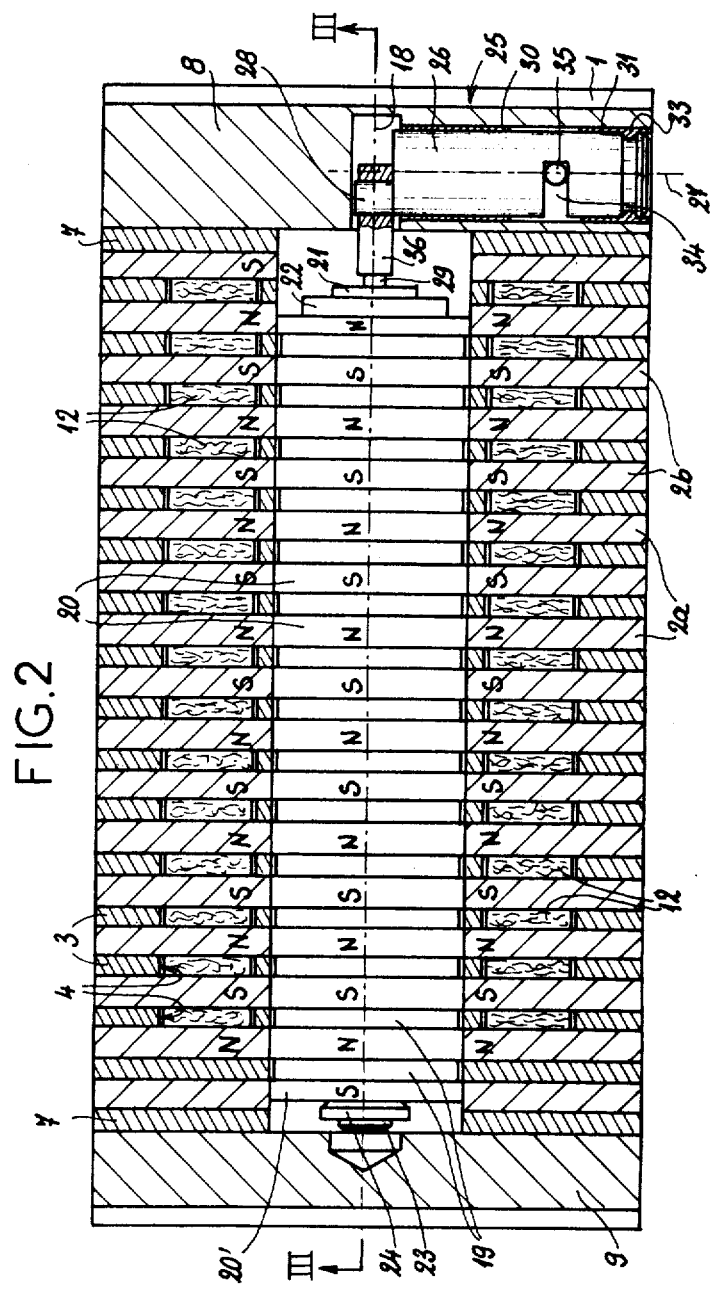

FIG.5

MAGNETIC CHUCK

FIELD OF THE INVENTION

My present invention relates to a magnetic holder, e.g. for iron, steel or other ferromagnetic bodies, especially workpieces, and, more particularly, to a mechanically actuated magnetic chuck particularly intended to secure a magnetically attractable workpiece to the worktable or other support of a machine tool such as a shaper, milling machine, grinders, drilling press or cutting appliance.

BACKGROUND OF THE INVENTION

The use of so-called magnetic chucks for retaining workpieces upon machine tools is widespread, especially in surface grinding, milling and drilling applications, such chucks being switched between an "effective" or ON state and an "ineffective" or OFF state by mechanical or electrical means.

In the effective state of the magnetic chuck, a magnetic field appears at a surface against which a magnetically attractable workpiece can be held by this field. In the OFF state, the magnetic field is released or eliminated at this surface so that the workpiece can be removed.

Some background in this field can be found in U.S. Pat. Nos. 3,340,442, 3,775,717 and 4,075,589 as well as in the references cited therein.

The term "magnetic chuck" is used herein in discussing the background of this invention, to refer also to worktables having the same capacity to affix a magnetically attractable workpiece to a surface.

More specifically, it is known to provide (see, for example, the French Pat. No. 1,452,241 commonly owned with the present case) a magnetic device for the purposes described which comprises permanent magnets and can be switched between effective and ineffective states. This device comprises a hollow body in which at least one first magnetic assembly is constituted by two mutually parallel stacks of permanent magnets extending longitudinally and in which the permanent magnets alternate with pole pieces. The polarities of the magnets are such that the pole pieces separate from the housing alternate along the stack between north and south polarities.

At least one second magnetic assembly is provided within the hollow body and is constituted by a stack of permanent magnets parallel to the first stacks and disposed between them, the second stack also having its permanent magnets alternating with pole pieces with alternately north and south polarities along the stack.

The magnetic field strengths of the two assemblies are equivalent so that a longitudinal displacement of one assembly relative to the other in a longitudinal direction through a distance corresponding to one pole width relative to the other assembly, between the effective and ineffective positions, causes the flux contributions of the two assemblies to cancel. A displacement of an equivalent degree in the opposite direction, causes flux addition and provides the desired magnetic field at the surface of the body.

The two spaced-apart stacks of the first assembly are thus stationary while the single stack of the second assembly is disposed centrally of the first stack and is connected at its end to a simple eccentric mechanism which effects the displacement. This mechanism, therefore, permits switching between the effective and ineffective operations.

In the ON position, the north poles of the movable central stack register with or are aligned with the north poles of the lateral stacks and the same applies to the south poles of the two assemblies. The lines of force of the magnetic field thus close through the air along the chuck surface between the opposite poles and permit attachment of magnetically attractable bodies to this surface. The flux of the two assemblies is therefore additive.

In the OFF position the north poles of the central stack are in registry with the south poles of the stationary stacks while the south poles of the movable central stack register with north poles of the stationary stacks. The lines of force of the magnetic field thus close within the hollow body in the juxtaposition regions of the mutually offset stacks thereby shortcircuiting the magnetic field of the stacks and neutralizing the fluxes. This annuls the magnetic field at the critical chuck surface and permits the workpiece to be removed or placed on the surface without impediment.

Since the magnetic forces are symmetrical with respect to the axis of the central stack, the force required to displace the latter is small thereby facilitating manipulation between ON and OFF states and increasing the useful life of the actuator. Since the pole pieces extend transversely of the axis and are of limited thickness, the pole width or pitch of the chuck is small enabling the chuck to be used to hold even relatively small magnetically attractable objects.

However, with the system described, utilizing a hollow body of magnetic material to accommodate the stacks, it is common practice to provide a sole plate to rest upon the worktable, a rectangular frame forming the four lateral faces and an upper pole plate. Neither the frame nor the sole plate participate in magnetic functions. Only the upper pole plate performs a magnetic function and has its attachment surface defined by alternating spacers and pole pieces corresponding in pitch or width to the pole pieces of the stationary stack with which they are aligned.

This construction, while very effective in attaching workpieces to the aforementioned surface is not always fully satisfactory since it cannot be used effectively unless it is attached mechanically by appropriate means, e.g. bolts, to the worktable and is incapable of holding objects which must be positioned by the lateral surfaces of the chuck. In fact, the mere presence of the sole plate appears to limit the versatility of the device.

OBJECTS OF THE INVENTION

It is the principal object of the present invention to provide a magnetic chuck of the mechanically operated permanent magnet type, which avoids the disadvantages of earlier systems and is more versatile and effective than the chucks of such earlier systems.

Another object of the invention is to provide an improved magnetic chuck which can have a holding magnetic field along at least some of the aforementioned lateral surfaces as well as the upper surface and in addition can magnetically anchor the chuck to the worktable of the machine tool.

SUMMARY OF THE INVENTION

These objects and others which will become apparent hereinafter are attained, in accordance with the present invention, with a magnetic body forming a magnetic chuck for the purposes described in which the hollow body is formed by a stack of alternating pole plates and spacers, the pole plates and spacers having thicknesses corresponding to the thicknesses of the permanent magnets and pole pieces of the stacks which are relatively displaceable to turn the device on and off in the manner described. The pole pieces and spacers are disposed in planes transverse to the direction of displacement of the movable stack so that the pole plates are aligned with the magnetic poles of all of the stacks in the ON position. These plates, which form the lateral surfaces along the long side of the body as well as the broad upper surface of the latter are formed with aligned openings receiving the stacks of permanent magnets as well.

Thus the invention fundamentally modifies prior constructions utilizing a housing which simply surrounds the stacks by making the hollow body a part of the magnetic flux paths on at least three sides of the body in the ON position. The ON and OFF switching of the device is effected in the known manner described previously but instead of the operative field appearing exclusively on the upper broad surface of the rectangular parallelepipedal body, the magnetic field also appears at the pair of long lateral flanks or sides of the body as well in the ON position. The number of surfaces to which a workpiece may be magnetically adhered is thereby increased and the user can select which of the surfaces will provide the best orientation and attachment of the workpiece. This increases machining versatility without requiring repositioning of the chuck.

According to another feature of the invention, the sole plate which has hitherto been considered a necessity, is eliminated so that the lower broad surface of the body is also formed by the pole plates and spaces. In this case, a magnetic field appears at the bottom surface as well to enable the switching of the device into the ON condition to cause the magnetic attraction at the bottom surface to retain the chuck on the worktable. When the device is switched to the OFF position, however, the chuck is detached from the worktable and can be moved or removed.

Alternatively, a sole plate or base plate can be provided, but preferably is composed of soft iron or steel and lies in contact with spaced-apart pole plates which always have the same polarity while pole plates of different polarity are spaced from this sole plate or base so as to be insulated magnetically therefrom.

This arrangement closes a magnetic field path through the sole plate, eliminating magnetic leakage and reducing the remanence on the shortcircuiting position of the magnetic field corresponding to the OFF position of the movable stack.

The absence of contact between polar plates and the sole plate in the ON position also enables the concentration of the magnetic flux on the three active surfaces of the magnetic body.

According to another feature of the invention, the permanent magnets of the movable central stack and the pole pieces thereof are of circular annular configuration and are mounted on a common rod or tube so as to be axially fixed thereon. The magnets of the lateral stack which are fixed can be of semiannular or semicircular form and can be received in openings of the nonmagnetic plates forming spacers between the pole plates forming the active surfaces of the body.

In this case, the magnets of the stationary stacks can be identical to the magnets of the movable stack except cut in half, thereby permitting the stationary stacks to be rigorously identical and the movable stack to be able to completely neutralize the fields of the stationary stacks upon movement into the OFF position.

According to another feature of the invention, the displacement of the movable stack of permanent magnets through a stroke equal to the thickness of the polar plates is effected in such manner as to reverse the polarity applied to them and thus permit demagnetization of bodies affixed to the block or chuck upon shifting from the ON to the OFF position.

BRIEF DESCRIPTION OF THE DRAWING

The above and other objects, features and advantages of the present invention will become more readily apparent from the following description, reference being made to the accompanying drawing in which:

FIG. 2 is a cross-sectional view through the chuck of FIG. 1, shown in its ON position and as seen from above;

FIG. 5 is a view similar to that of FIG. 2 showing the device in its OFF position.

SPECIFIC DESCRIPTION

Figure 1:
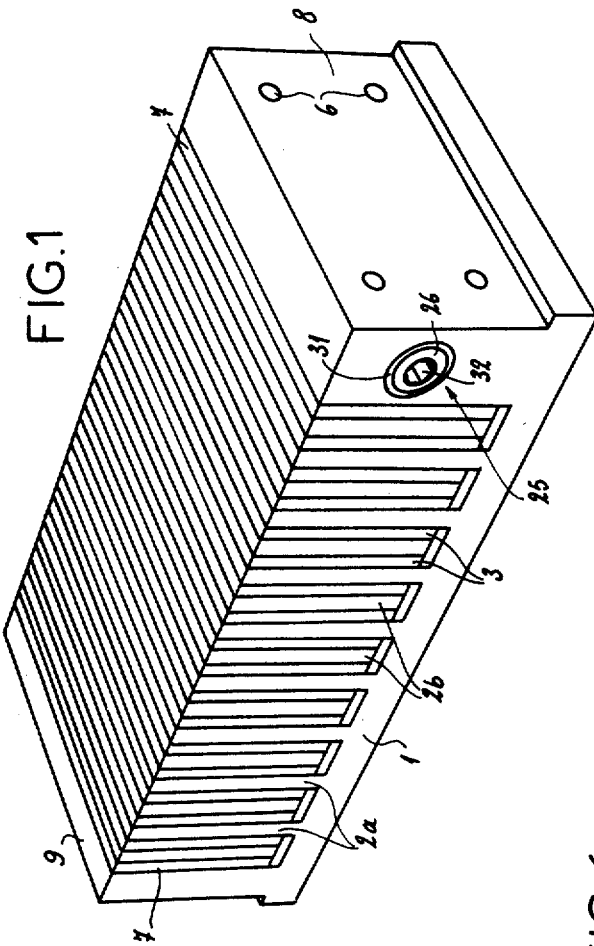
FIG. 1 is a perspective view of a magnetic body or chuck used, for example, in holding workpieces for machining, in an embodiment of the invention in which the magnetic body has a sole or base plate.

The magnetic body shown in FIGS. 1 through 5 comprises a rectangular sole plate or base 1 and a rectangular parallelepipedal body constituted by a stack of plates 2a and 2b of extra soft iron or steel of high magnetic permeability which alternate with plates 3 of a nonmagnetic material such as brass, duralumin, stainless steel or the like.

The plates 3 are each provided with two rectangular lateral openings 4 of the same width and all of the plates 2a, 2b and 3 are provided with a circular central opening 5 of the same diameter. The openings are aligned and the plates are held in place by tierods 6 which are anchored in a pair of end plates or terminal blocks 8 and 9 of different shape from that of the plates previously described.

The end pieces 8 and 9 bear upon the stack via nonmagnetic plates 7 which terminate the stack of alternating magnetic and nonmagnetic plates. The nonmagnetic plates 7 do not have lateral openings while the end pieces 8 and 9 do not have any opening corresponding to those of the plates 3.

The magnetic block thus has two lateral hollows lying parallel to one another resulting from alignment of the respective lateral openings 4 of the plates 3.

These hollows receive the fixed permanent magnets 12 of high coercive force, preferably of the ferrite type, in the form of semiannular or semicircular bodies produced by cutting circular magnets in half along a diameter. These magnets 12 are separated from one another by the polar plates 2a and 2b so that they constitute a pair of fixed lateral permanent magnet stacks.

The permanent magnets 12 are magnetized in the longitudinal dimension of the magnetic block and are positioned with alternating polarity (see FIG. 2) so that each stack comprises sequences of a polar plate 2a which is polarized north, a polar plate 2b which is polarized south, this alternation repeating along the stack and being represented by the letters N and S.

One of the two polar plates, in the embodiment showing the plates 2a, contacts the sole plate 1 which is composed of soft iron or steel. The other of the polar plates 2b is spaced at a distance from the sole plate 1, either through an air gap or through a spacer material which is nonmagnetic (see FIGS. 1 through 3) by a distance sufficient to effectively magnetically isolate the plates 2b from the sole plate. Thus all of the plates 2a having the north polarity are shortcircuited by the sole plate 1 while all of the plates 2b of the opposite polarity south are magnetically insulated from this sole plate.

The movable magnetic assembly is mounted in the central cylindrical hollow formed by the openings 5 for movement along the axis A. This assembly is constituted by a third stack of high coercive force, preferably ferrite, permanent magnets 19 which are circular annuluses and correspondingly shaped pole pieces 20 of a material of high magnetic permeability, especially extra soft iron or steel.

The permanent magnets 19 and the pole pieces 20 are mounted upon a common tube 21 which may be nonmagnetic. At one end the tube 21 is externally threaded and carries a clamping nut 22 bearing against a first pole piece. At its other end, the tube 21 is internally threaded and screwed onto a clamping head 23 which passes through the last pole piece 20', the latter being held in place by a nut 24 externally threaded into the head 23. Thus the stack of magnetic and nonmagnetic rings is clamped and fixed axially to the tube.

Figure 3:
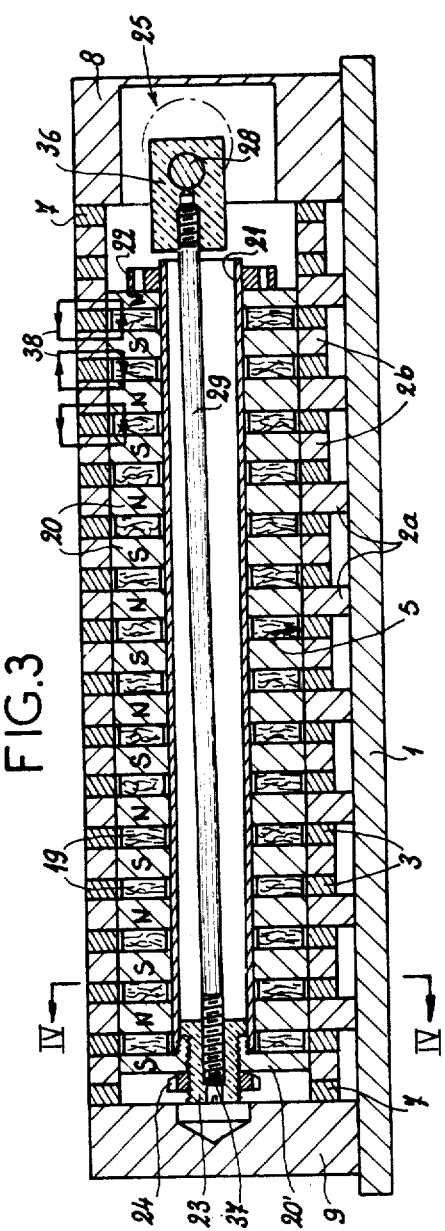
FIG. 3 is a longitudinal section through the body taken along the line III—III of FIG. 2.
Figure 4:
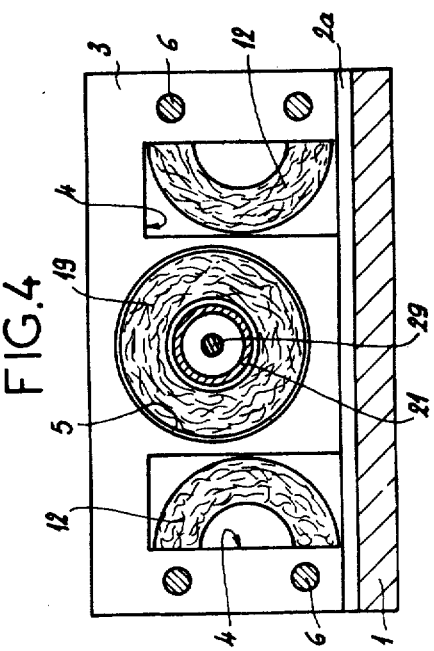
FIG. 4 is a transverse section taken along the line IV—IV of FIG. 3.

The magnets 19 are magnetized in a direction parallel to the axis 18 of the movable stack and are disposed on the tube 21 with alternating polarity so that each pole piece 20 which is north is followed by a pole piece 20 which is south, then by a pole piece which is north, etc., as represented by the letter N and S in FIGS. 2 and 3.

The pole pitch, i.e. the sum of the axial width or thickness of each pole piece and associated permanent magnet 19, is equal to the polar pitch of the stationary stacks measured in an equivalent manner.

Furthermore, the movable stack has a flux equivalent to the total magnetic flux of the fixed magnet stacks. This is guaranteed by simply using the same circular magnets for all of the stacks but cutting in two those which are to serve for the stationary stacks.

The central stack is displaceable along the axis 18 by a distance equal to the polar pitch by an actuating device 25 mounted in the end piece 8.

In the embodiment illustrated, this actuator 25 is of manual type. However, it may equally be provided with a fluid-operated cylinder or motor or an electrical actuator such as a solenoid.

The device comprises a shaft 26 journaled for rotation in the end piece 8 about an axis 27 perpendicular to the axis 18 and having a hexagonal socket 32 which can receive a complementary key, handle, lever or allen wrench for rotating the shaft 26.

At its inner end the shaft carries an eccentric pin 28 which extends parallel to but is offset from the axis 27, this pin being connected by a rod 29 to the head 23 at the far end of the tube 21.

The shaft 26 is rotatable in two rings fitted into the end piece 8 and represented at 30 and 31. In addition, the shaft has a slot 34 in which a fixed finger or pin 35 engages to prevent axial movement of the shaft and its removal from the end piece 8, this pin 35 extending radially with respect to the axis 27. The pin and slot create as well a system enabling rotation of the shaft through about 180° but limiting further rotation in either direction.

The rod 29 is threaded at both of its ends, one end being screwed into an eye 36 pivotal on the pin 28 while the opposite end is threaded into the head 23 at an axial internal thread of the latter as mentioned previously.

In the ON position illustrated in FIGS. 2 and 3 the central stack is in a position in which the north pole pieces 20 register with the north pole pieces 2a of the two lateral fixed stacks while the south pole pieces 20 register with the south pole pieces 2b of the fixed stack.

Because of this positioning, the lines of force 38 (FIG. 3) can only close externally along the upper broad face and along the two longitudinal lateral faces of the body, thereby enabling a magnetic attachment of a ferromagnetic workpiece to either or all of these surfaces. The external magnetic induction results from the addition of the fluxes generated by the two lateral fixed stacks and the central movable stack and the three stacks function in parallel from the point of view of the magnetic circuit.

Figure 5:
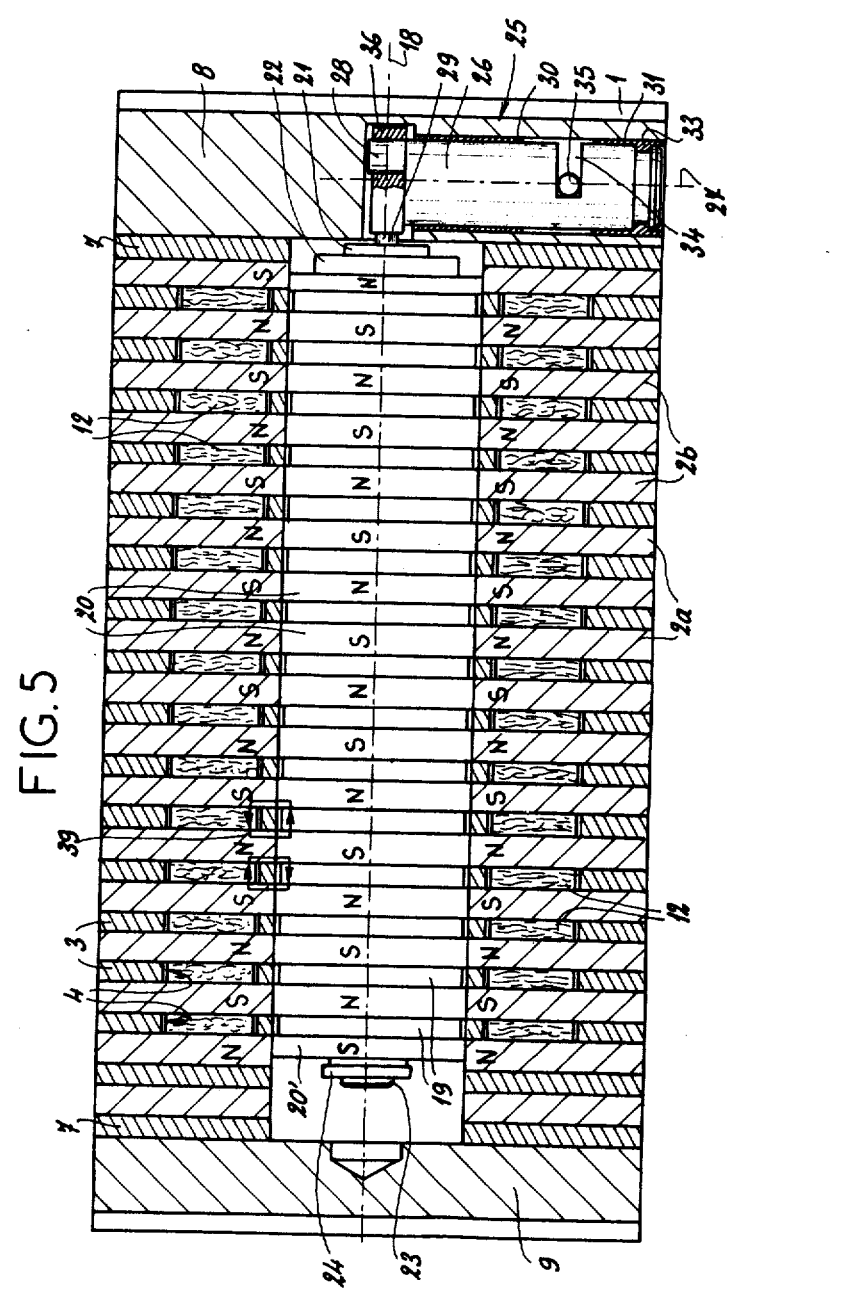

Rotation of the shaft 26 through about 180° swings the pin 28 about the axis 27 and thereby draws the central stack to the right (see FIG. 5).

The eccentricity of pin 28 is selected such that the rotation through 180° will displace the central stack through a distance equal to one pole position as defined previously.

In this OFF position the north and south pole pieces 20 are made coplanar and register with the south and north pole pieces 2b and 2a of the stationary stacks so that the lines of force of the magnetic field close within the interior of the body as shown at 39 in this FIGURE. The flux of the central stack is thus subtracted from the flux of the stationary stacks and a field closure on the exterior of the body is canceled.

In addition to the ON/OFF operation described, it is possible to form the actuator such that the displacement of the central stack is effected through a further pole pitch distance thereby inverting the magnetic fields and permitting reversal of the field lines at the surface to demagnetize the workpiece. Naturally, a similar result can be obtained if the central stack is fixed and the lateral stacks are made movable.

Figure 6:
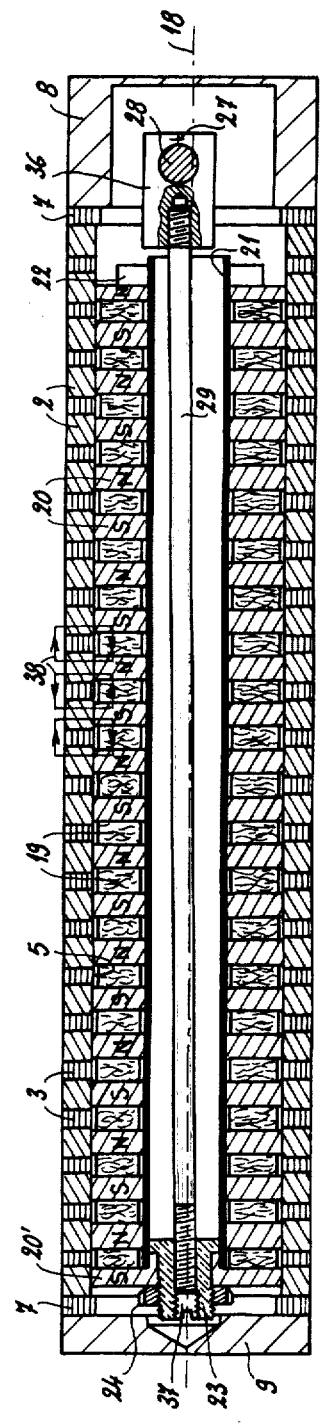
FIG. 6 is a longitudinal section similar to that of FIG. 3 but illustrating an embodiment of the invention without a sole plate.

FIG. 6 shows an embodiment of the invention in which the sole plate is eliminated. In this case all of the pole plates 2 are identical and define with the plates 3 both the upper broad surface and the lower broad surface of the parallelepipedal body. In this case, when the movable stack is shifted in the manner described, the external magnetic field closure at the lower face serves to attach the chuck to a ferromagnetic worktable.

The invention is of course not limited to the two preferred or best mode embodiments described and various modifications can be made utilizing the principles set forth. For example, instead of circular rings forming the magnets or the pole pieces of the central stack and semicircular ring segments forming the magnets of the fixed stacks, these elements can have a square or rectangular shape, especially as to their outer configurations.

The eccentric actuator may be replaced by a lever or other control element, e.g. a screw-and-nut arrangement. The relative movement may be effected in a different manner as mentioned above and, of course, depending upon the magnetic field required, the size of the surfaces, etc., a greater number of fixed and movable stacks may be provided end to end or side by side.

I claim:

1. A magnetic device, especially a chuck for magnetic retention of workpieces, comprising:
   a stack of alternately magnetic and nonmagnetic plates defining an exposed upper surface and at least two exposed lateral surfaces adjoining said upper surface of a body, said stack extending longitudinally and said plates being perpendicular to the longitudinal dimension of said stack, said plates each having at least one opening and said openings being aligned along said stack to form at least one longitudinally extending hollow,
   a first magnetic assembly received in said hollow and comprising at least one stack of alternating permanent magnets and pole pieces with the pole pieces of said first assembly alternating in magnetic polarity;
   a second magnetic assembly mounted in said body and comprising at least one stack of permanent magnets for creating magnetic polarities alternating along said second assembly, said pole pieces corresponding in thickness measured along the longitudinal dimension generally to the thicknesses of said plates, the magnetic pitch of said first assembly being equal to the distance between corresponding portions of successive pole pieces; and
   means mounted on said body engaging one of said assemblies for displacing same longitudinally through a distance at least equal to said magnetic pitch thereby shifting selectively between an ON position in which a magnetic field appears at each of said surfaces to affix a workpiece thereto and an OFF position in which the magnetic field at said surfaces is substantially canceled, the other of said assemblies being fixed relative to said body.

2. The device defined in claim 1 wherein said magnetic plates form pole pieces of a pair of lateral stacks of permanent magnets forming said second assembly, said nonmagnetic plates being provided with respective openings aligned in the longitudinal dimension and receiving the permanent magnets of the stacks of said second assembly, said hollow being disposed centrally between the aligned openings of the permanent magnets of said second assembly, said first assembly being movable in said hollow and being displaceable by said distance at least equal to the magnetic pitch to shift between ON and OFF positions.

3. The device defined in claim 2, further comprising a sole plate underlying said body and in magnetic contact with magnetic plates of one polarity, the magnetic plates of opposite polarity being magnetically spaced from said sole plate, said sole plate being composed of a material of high magnetic permeability.

4. The device defined in claim 2 wherein said plates form directly a lower surface of said body magnetically attracted to a worktable in said ON position.

5. The device defined in claim 3 or claim 4 wherein said permanent magnets and said pole pieces of said first assembly are annular and are axially fixed on the common support for displacement in said hollow, said permanent magnets of said second assembly each being a semiannulus cut from an annular permanent magnet identical to those of said first assembly.

6. The device defined in claim 1 or claim 2 wherein said one of said assemblies is displaceable relative to the other of said assemblies through a distance greater than said magnetic pitch whereby a body at one of said surfaces is demagnetized.

7. The device defined in claim 5 wherein said body is rectangular parallelepipedal and is flanked by a pair of end plates, said stack of said first assembly being formed on a tube, said displacing means including a rod extending through said tube and anchored to one end thereof, an eccentric mounted in one of said end plates remote from said end of said tube, and means connecting said eccentric to said rod.

* * * * *